April 1, 1941. O. STEINER 2,236,925
AUTOMATIC DIAPHRAGM ADJUSTING MECHANISM FOR PHOTOGRAPHIC CAMERAS
Filed Jan. 12, 1940 10 Sheets-Sheet 1

Inventor:
Oscar Steiner,
by Emery, Booth, Townsend, Miller and Swicker Attys

April 1, 1941. O. STEINER 2,236,925
AUTOMATIC DIAPHRAGM ADJUSTING MECHANISM FOR PHOTOGRAPHIC CAMERAS
Filed Jan. 12, 1940 10 Sheets-Sheet 3
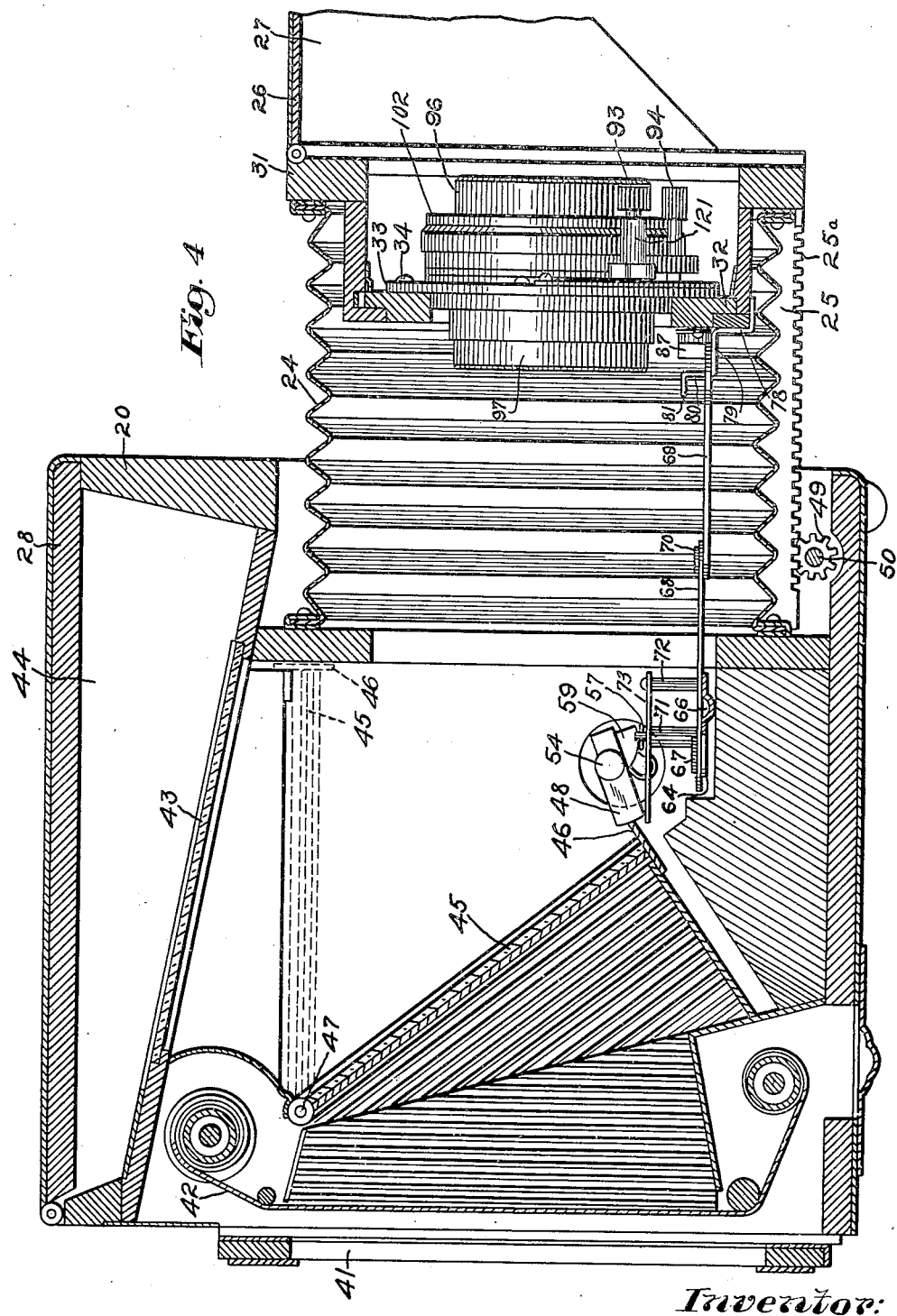
Inventor:
Oscar Steiner,
Attys April 1, 1941.  O. STEINER  2,236,925
AUTOMATIC DIAPHRAGM ADJUSTING MECHANISM FOR PHOTOGRAPHIC CAMERAS
Filed Jan. 12, 1940   10 Sheets-Sheet 4
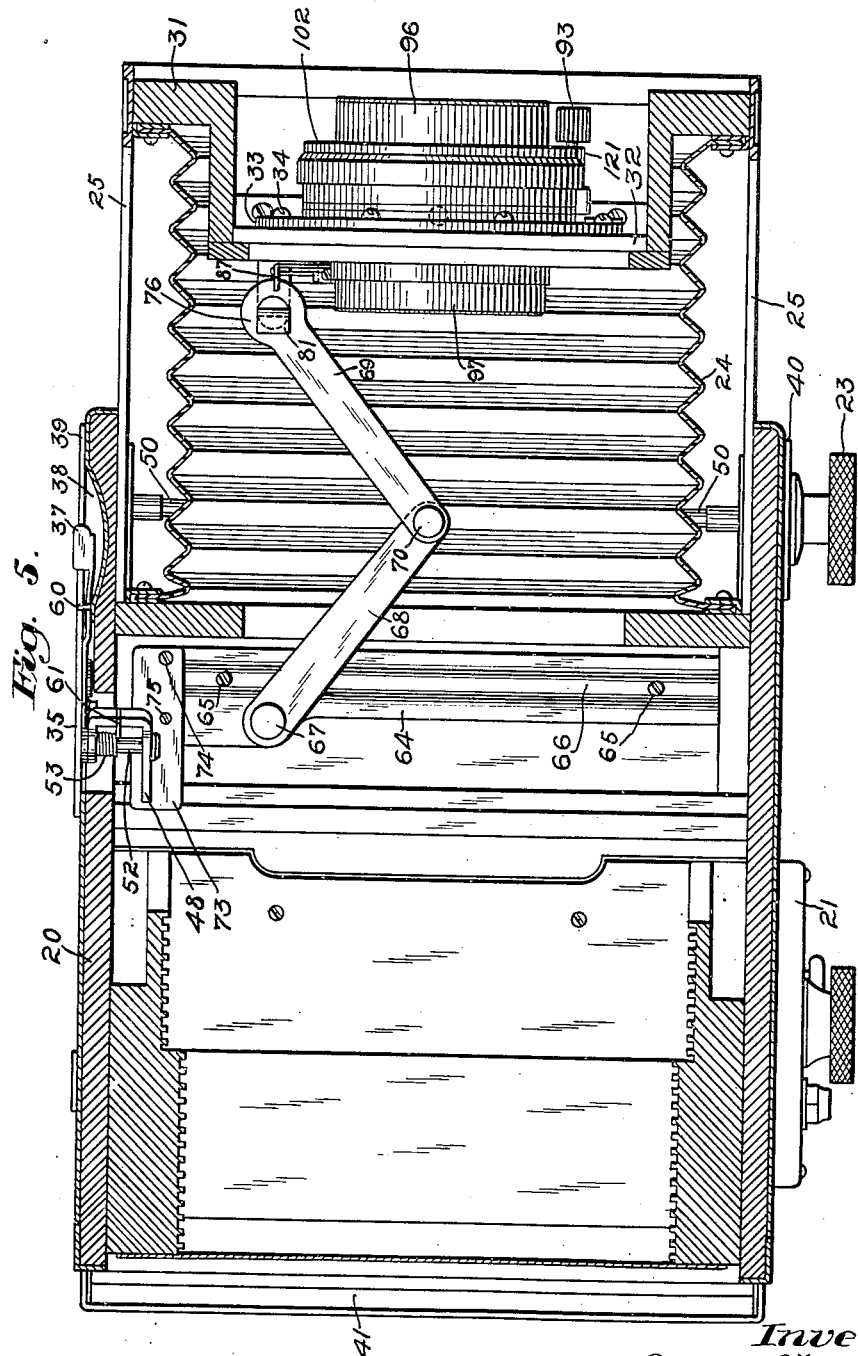
Inventor:
Oscar Steiner
by Emery, Booth, Varney, Miller and Seidner
Attys.

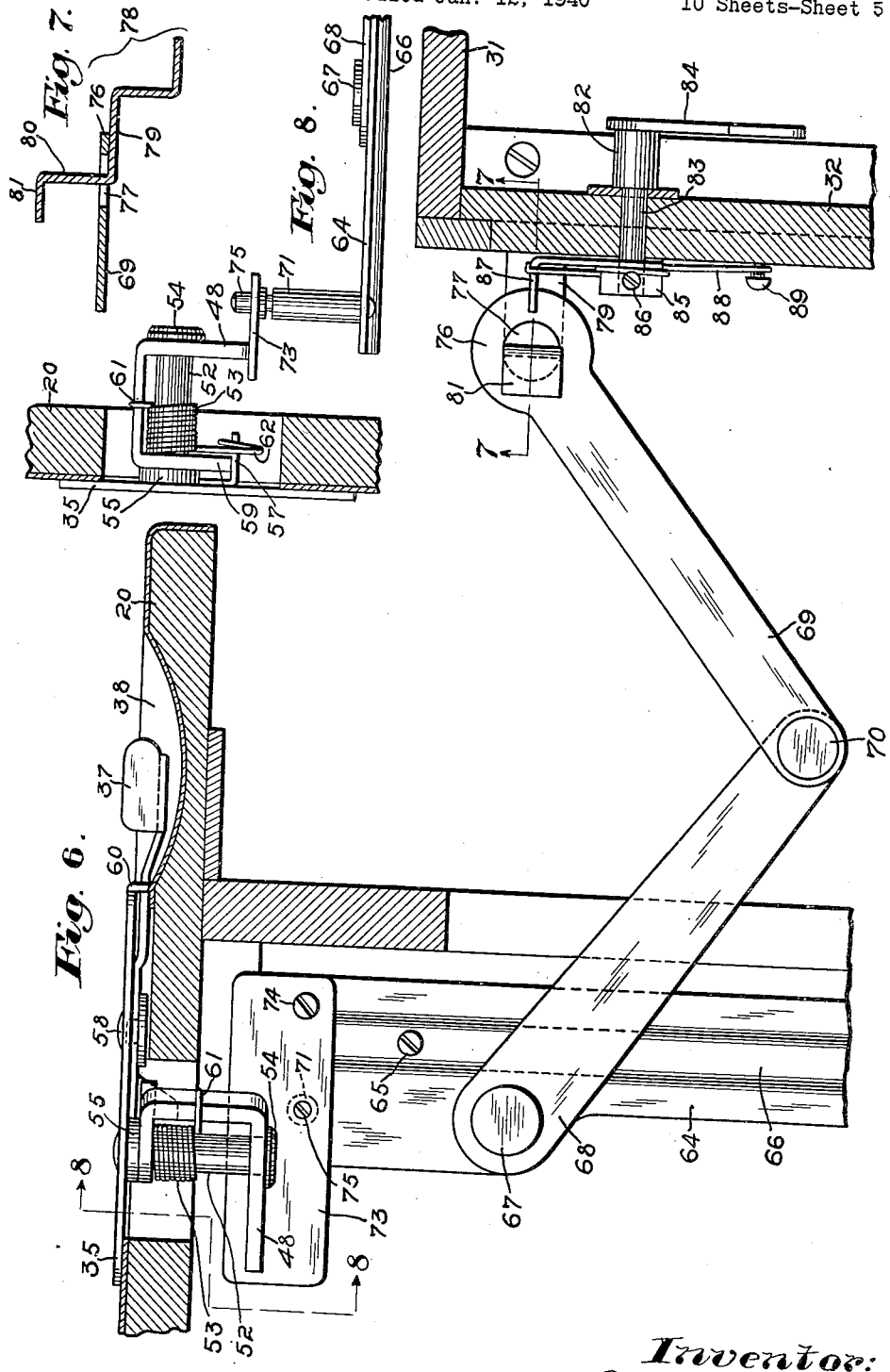

April 1, 1941. O. STEINER 2,236,925
AUTOMATIC DIAPHRAGM ADJUSTING MECHANISM FOR PHOTOGRAPHIC CAMERAS
Filed Jan. 12, 1940 10 Sheets-Sheet 6
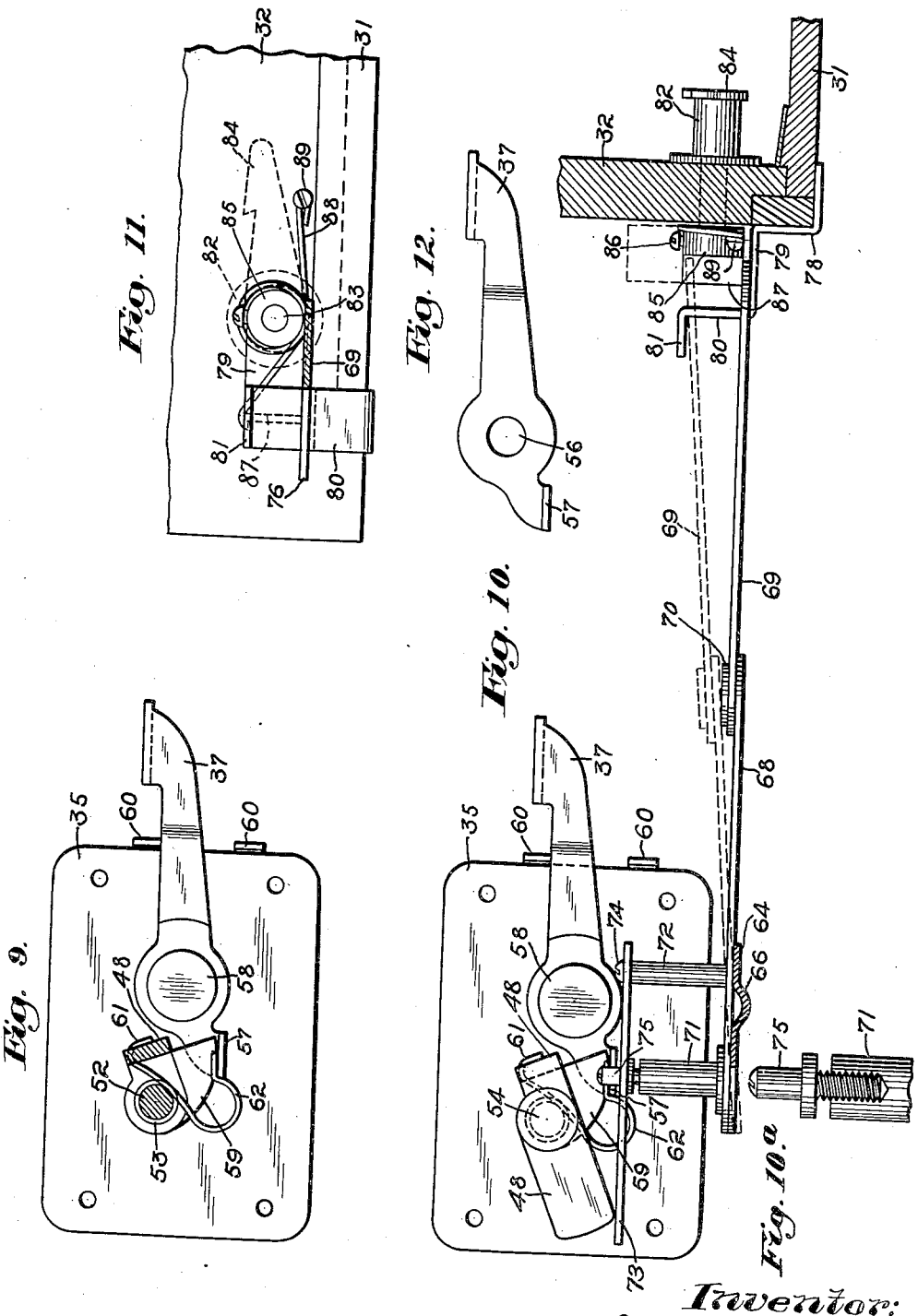
Inventor:
Oscar Steiner

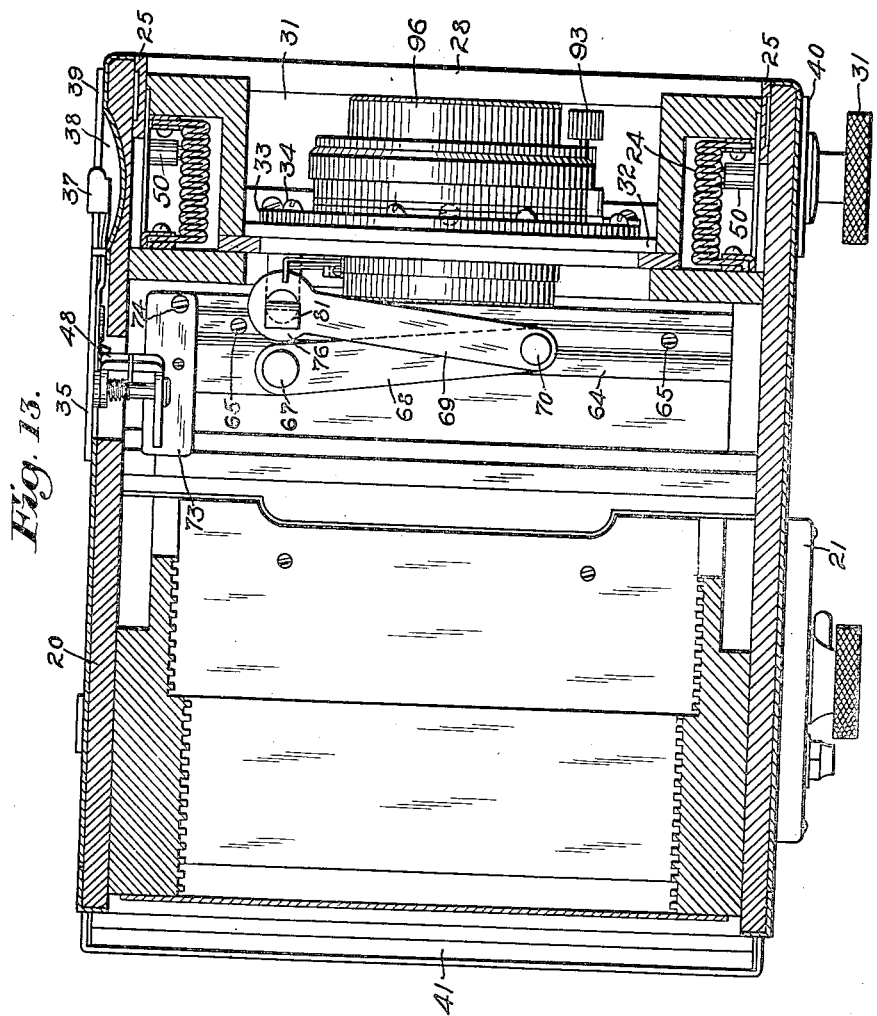

April 1, 1941.  O. STEINER  2,236,925

AUTOMATIC DIAPHRAGM ADJUSTING MECHANISM FOR PHOTOGRAPHIC CAMERAS

Filed Jan. 12, 1940  10 Sheets-Sheet 8

Inventor:
Oscar Steiner,
by Emery, Booth, Townsend, Mullin & Laidlaw
Attys

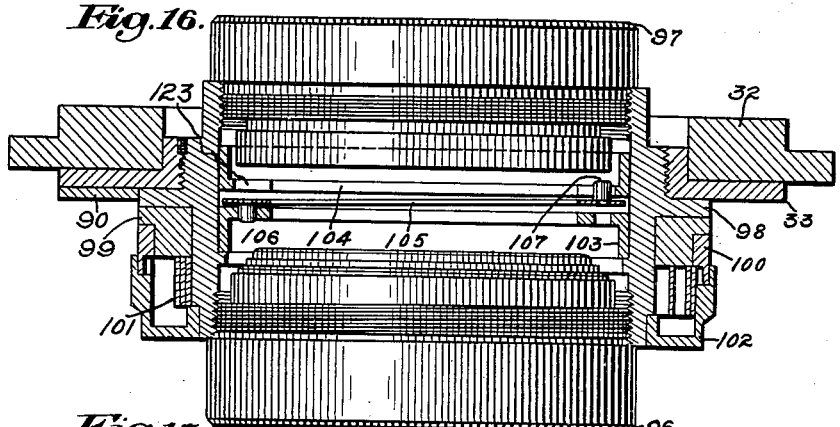
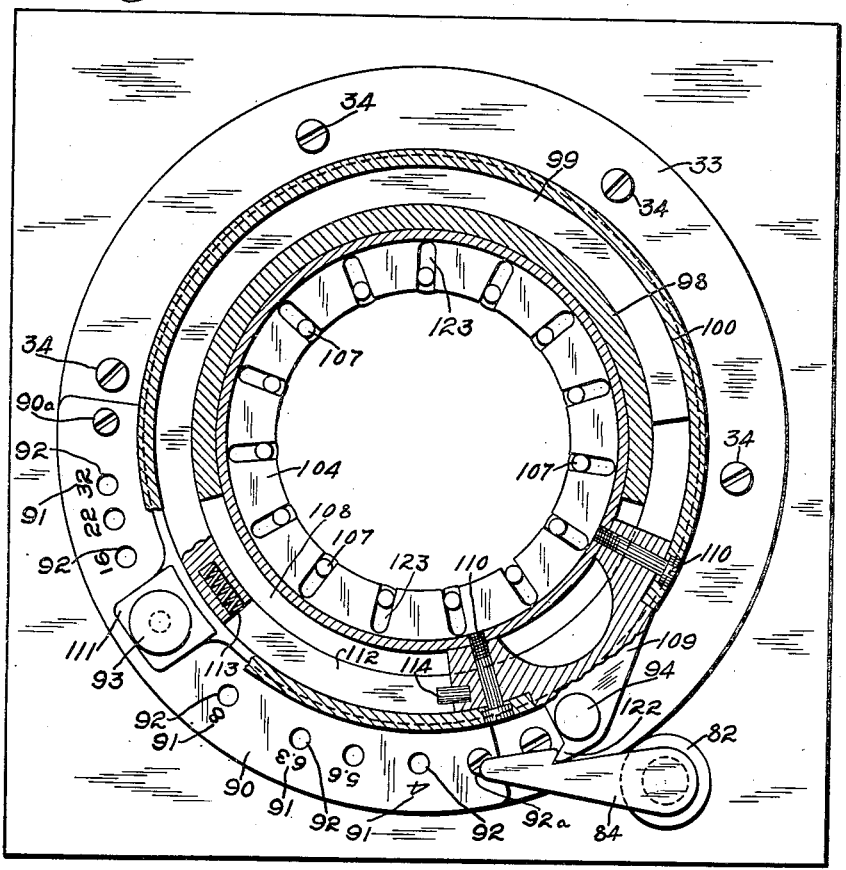

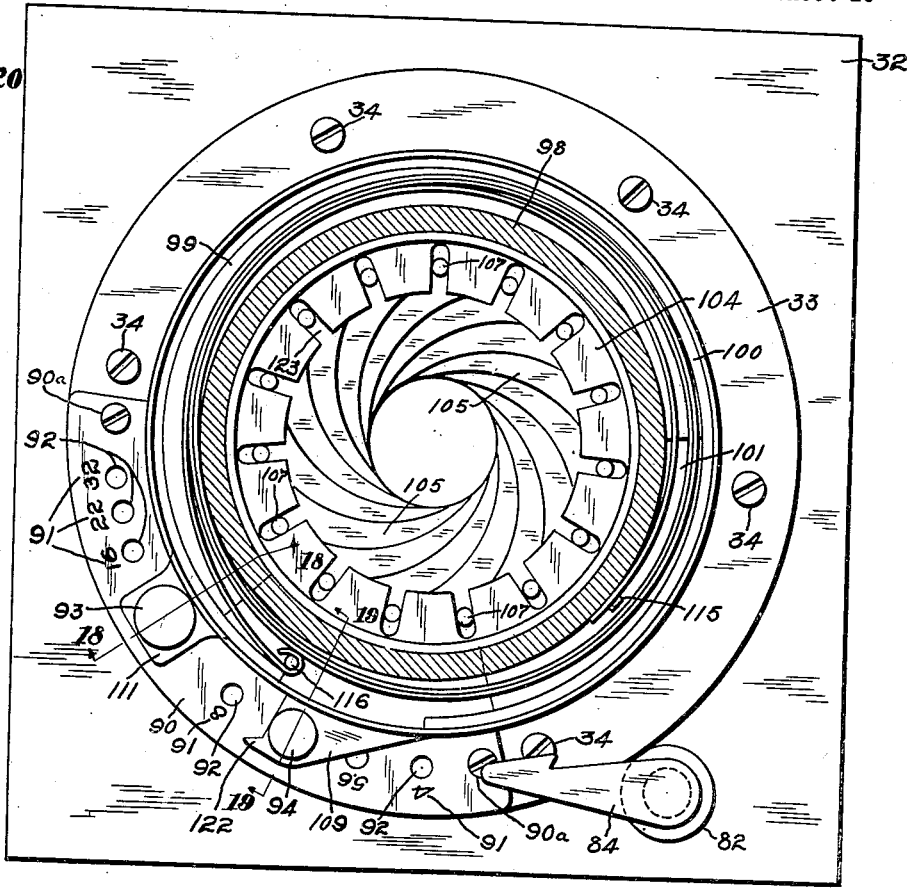
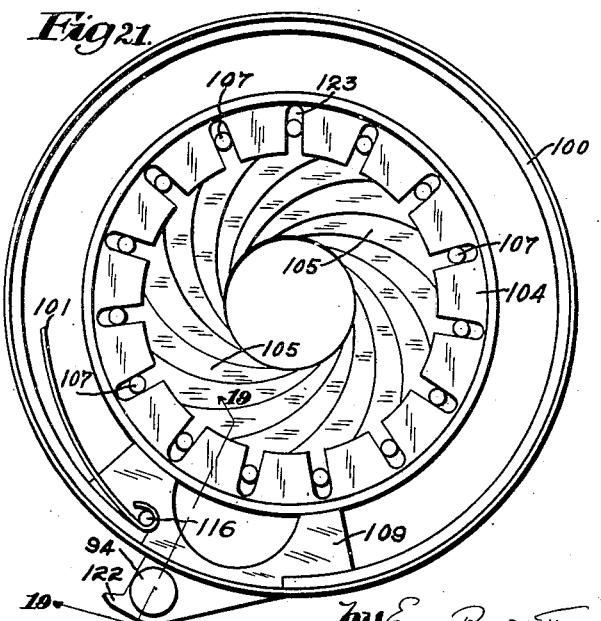
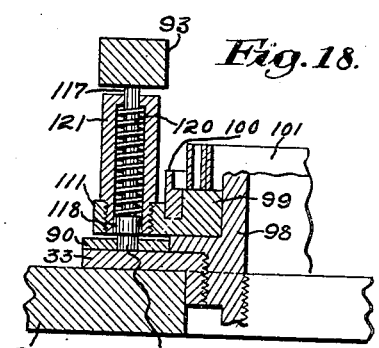
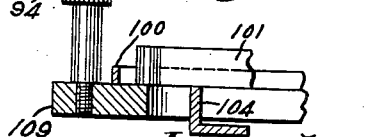

Patented Apr. 1, 1941

2,236,925

UNITED STATES PATENT OFFICE 2,236,925

AUTOMATC DIAPHRAGM ADJUSTING MECHANISM FOR PHOTOGRAPHIC CAMERAS

Oscar Steiner, Irondequoit, N. Y., assignor to The Folmer Graflex Corporation, Rochester, N. Y., a corporation of Delaware Application January 12, 1940,
Serial No. 313,534

11 Claims. (Cl. 95—42)

The invention relates to automatic diaphragm adjusting mechanism for photographic cameras, particularly of the reflex or reflecting type.

In order that the principle of the invention may be readily understood, I have disclosed a single embodiment thereof in the accompanying drawings, wherein—

Fig. 4 is a longitudinal, vertical section through the camera, showing the coupling means between the mirror-release lever and the automatic diaphragm releasing mechanism.

Fig. 5 is a longitudinal, transverse section through the camera, showing the manner of maintaining the coupling means between the mirror-release lever and the automatic diaphragm control, even though the lens position be changed with respect to the focal plane;

Fig. 6 is a partial transverse section on an enlarged scale showing the diaphragm operating means coupled to the mirror-release lever;

Fig. 7 is a sectional detail on the line 7—7 of Fig. 6;

Fig. 8 is a section on the line 8—8 of Fig. 6, showing the mounting of the mirror-release lever and the connection to the automatic diaphragm operating means;

Fig. 9 is a detail, mainly in elevation, of the mirror-release lever operating plate as viewed from the interior of the camera;

Fig. 10 is a view similar to Fig. 9, but showing also the coupling means between the mirror-release lever and the automatic diaphragm control means;

Fig. 10a is a sectional detail of a part shown in Fig. 10;

Fig. 11 is a fragmentary rear view, partly in section, of the camera front box, showing the mounting of the automatic diaphragm-release pawl;

Fig. 12 is a side elevation of the mirror-release lever;

Fig. 13 is a horizontal, longitudinal section through the camera, showing the lens moved back in the direction of the focal plane, and showing the construction of the collapsible automatic diaphragm operating lever;

Fig. 16 is a vertical section through the lens mount, showing the relation of the illustrated parts;

Fig. 17 is a vertical section through the lens mount, showing the automatic diaphragm resilient bumper and means connecting the diaphragm ring latch dog;

Fig. 18 is a sectional detail on the line 18—18 of Fig. 20;

Fig. 19 is a sectional detail on the line 19—19 of Figs. 20 and 21;

Fig. 20 is a view similar to Fig. 14 excepting that certain parts appear in section, so as more clearly to show the construction of the diaphragm operating means;

Fig. 21 is a view similar to Fig. 20, but on a smaller scale, and showing the connection between the automatic diaphragm adjusting ring and the automatic diaphragm operating pawl;

Fig. 22 is a side elevation of one of the diaphragm leaves to show more clearly the position of the diaphragm leaf operating pins; and Fig. 23 is a top plan view of Fig. 22.

Figure 1:
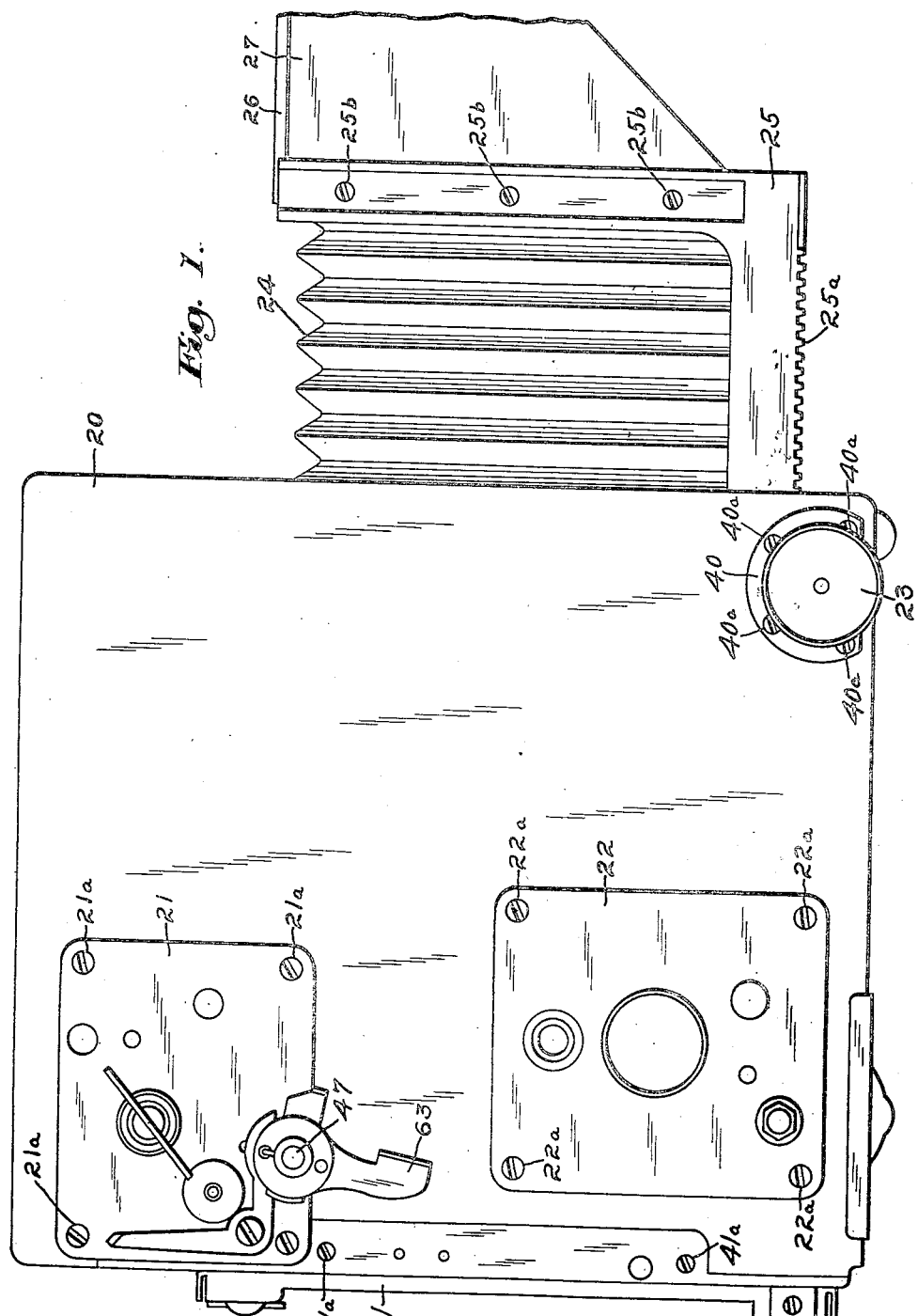
Fig. 1 is a side elevation of a reflex camera showing the bellows extended and having my invention incorporated therein.
Figure 2:
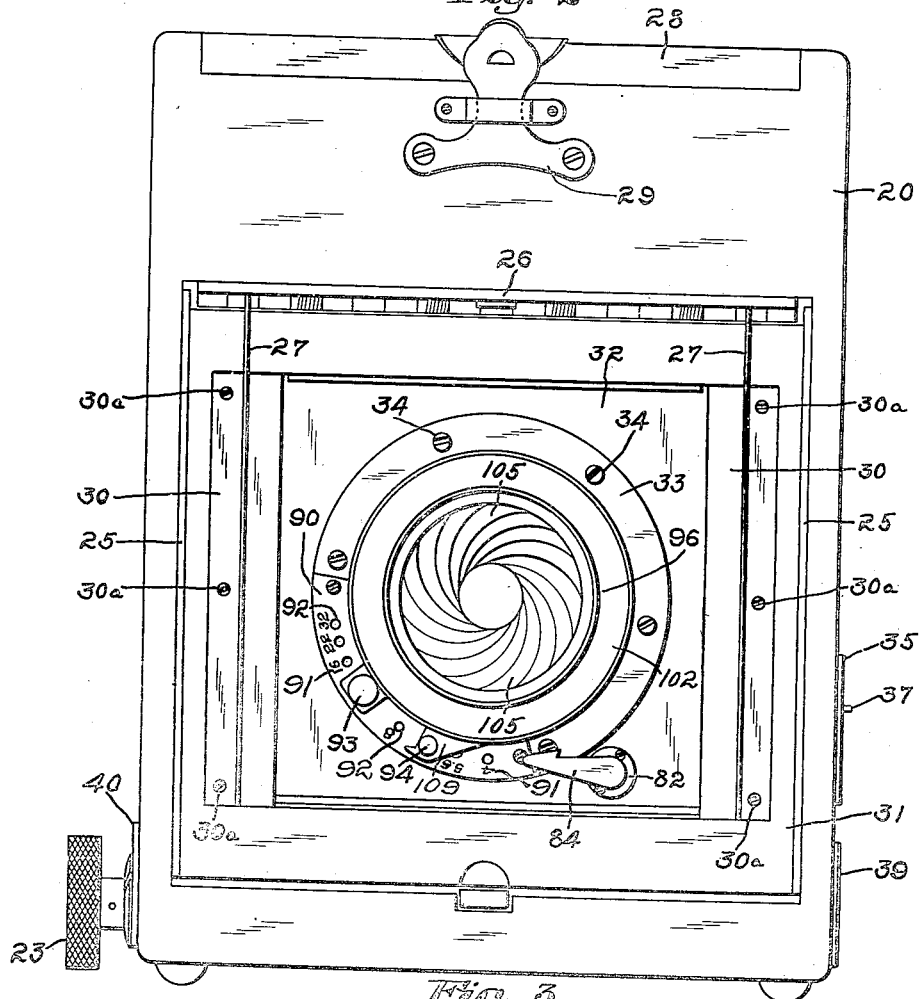
Fig. 2 is a front elevation of the camera with the focusing hood closed, showing the lens and a part of its operating mechanism.
Figure 3:
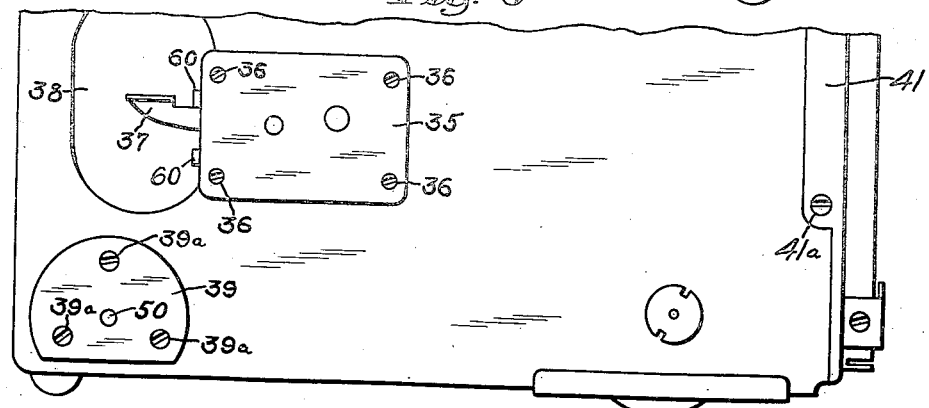
Fig. 3 is a fragmentary side elevation of the camera, showing the mirror-release lever.

It is well known to the users of single-lens reflex cameras that it would be a decided advantage to focus with the diaphragm wide open, thereby having available a greater quantity of light on the ground glass than would be had if the diaphragm were stopped down to that aperture at which the picture was to be made. Assuming, for example, that the operator is desirous of making an exposure at $f11$, as a rule, insufficient light would reach the ground glass focusing screen to focus the camera accurately. However, if the diaphragm were open, say to $f4.5$, adequate light would be had. But in making these changes manually, the operator often forgets or does not have the time to adjust the diaphragm to its proper setting after focusing. I herein disclose automatic means for doing this, providing means whereby the diaphragm of the lens is set at the full open position and a pre-selected stop is chosen and adjustment made accordingly. At the instant of making the exposure, the diaphragm operating mechanism is released automatically, closing down the diaphragm to that pre-selected opening without any thought on the part of the operator.

There have been several attempts to provide means for accomplishing this result. The mechanism disclosed in the patent to Torkel Korling No. 2,029,238, dated January 28, 1936, is so far as I am aware the nearest approach in the prior art to a satisfactory solution of this problem.

To have a satisfactorily operating automatic diaphragm stop, it is necessary that it work not only on one particular lens but on any lens that may be chosen to be used with the camera, and it is very desirable that no adjustment be made on any of the operating mechanism other than the changing of the lens in the usual manner. In my herein disclosed invention this is taken care of, and any lens, if provided with automatic diaphragm adjusting means, is, in the practice of my invention, instantly coupled with the operating mechanism when that lens is inserted in the camera.

In accordance with the present invention, lenses and lens-boards can readily be changed without in any way making adjustments of or in the diaphragm control means. The disclosure in the said Korling patent is confined to the use of one lens only, whereas in accordance with my invention any number of lenses can be used interchangeably, provided the lens mounts are equipped with the automatic feature, and they can all be controlled from the mirror-release mechanism. As hereinafter fully disclosed, the mirror-release mechanism is so adjusted or constructed that the diaphragm-release takes place just prior to the release of the mirror, and if the operator of the camera so desires, the diaphragm only can be released by merely partially depressing the mirror-release lever. This is of advantage to the operator as it gives him an opportunity to check on the depth of focus when the lens is stopped down. However, the normal operation of the parts herein disclosed comprises the step of (a) setting the mirror, (b) winding the shutter, (c) selecting the diaphragm stop position to be used, and (d) pressing the mirror-release all the way down, which act will (1) release the automatic diaphragm and (2) release the mirror which in turn trips the shutter.

The structure of the lens mount itself is novel and the construction is such that the diaphragm leaves are not affected even with prolonged use of the camera.

Referring first to Figs. 1 to 5 of the drawings wherein a reflex or reflecting type of camera is shown, inasmuch as my invention is more particularly adapted to the said type of camera, though not limited thereto in all respects, the camera box or casing is indicated at 20. The shutter mechanism plate is indicated at 21, the shutter tension plate at 22, the focusing knob at 23, the bellows at 24, the camera front side rails at 25, the lens shade top door at 26, and the lens shade wings at 27, 27.

The camera top door is indicated at 28 and the camera top door latch at 29. The lens shade-wing attaching means are indicated at 30, 30, and by means of screws 30a, 30a, they are attached to the camera front 31. Then lens-board is indicated at 32 and the lens flange is indicated at 33, it being attached to the lens-board 32 by means of screws 34, 34. The mirror-release plate is indicated at 35, it being attached to the camera box or casing 20 by means of screws 36, 36, best shown in Fig. 3. The mirror-release or mirror-operating lever is indicated at 37, and there is provided in the side of the camera box or casing 20 a cut-out or depression 38 providing clearance for the operation of the said lever 37. One suitable focusing pinion bearing 39 is attached to the camera box or casing 20 by means of screws 39a, 39a. The right hand focusing pinion bearing is indicated at 40, it being attached to the right hand side of the camera box or casing 20 by means of screws 40a, 40a. The camera back is indicated at 41, it being attached to the camera box or casing 20 by means of screws 41a, 41a. The foregoing parts may be of any suitable construction, and except as hereinafter set forth they do not constitute novel features of my invention.

In Fig. 4 is shown a typical construction of a reflex or reflecting camera to which this invention is more particularly adapted. Reflex or reflecting cameras are constructed in several well known forms, and the particular type of camera herein illustrated has been chosen from among the said well known forms as one means or example for affording the illustration of the automatic diaphragm control to which my invention particularly relates. My invention will be described as applied to the particular type of reflex camera herein shown, but it is to be understood that my invention is not limited to use only with such disclosed type.

Still referring particularly to Fig. 4, the curtain of the focal plane shutter of the usual type is indicated at 42, and is so well known as not to require further description herein. The ground glass focusing screen is indicated at 43. The hood used with this type of camera is positioned in the space indicated at 44, but the hood has been omitted from said figure in order to permit a more clear showing of the construction of the camera.

The reflecting mirror itself is indicated at 45, it being carried by a mirror frame 46 pivoted on a shaft 47, the said mirror being held in the position shown in Fig. 4 by a latch 48. The mirror frame 46 is provided with spring means to cause it to travel to the position shown in dotted lines in said figure, when the latch 48 clears the mirror frame 46. The said spring means may be any well known or suitable tensioning means.

The focusing means is very clearly shown in Fig. 4. For effecting focusing, the side rails 25 are provided with gear teeth 25a meshing with pinions 49 attached to a shaft 50, most clearly shown in Fig. 5. The said shaft passes through the bearing plates 39, 40, and has attached thereto the focusing knob 23, previously referred to. The said knob 23 and the pinions 49, 49 are attached to the shaft 50 in any well known manner, as, for example, by taper pins. Any movement of the focusing knob 23 will be transmitted through the pinions 49, 49, and the rack teeth 25a of the side rails 25 will cause a like movement of the camera front 31, which is attached to the side rails 25 by means of screws 25b, shown in Fig. 1, thus providing ready means for focusing.

The said camera front 31 is made up of a box-like structure provided with an opening at the rear end to receive the lens board 32, which is attached to the said camera front 31 and is held in place in a manner so well known as to need no further description herein.

The mirror-holding and the releasing latch 48 is caused to be moved in the proper direction to retain the mirror frame 46, namely, in the position shown in Fig. 4, by means of a coiled spring 53, shown in Fig. 5 and elsewhere. The structure of the said holding and releasing latch 48 is most clearly shown in Figs. 5, 6 and 8. As shown in Figs. 6 and 8, the said latch 48 is a U-shaped structure having holes through which passes the shaft or pin 52, which is provided with a head 54 and a spacing washer 55.

Also attached to the mirror-release plate 35 is the said mirror-release or operating lever 37, shown in detail in Fig. 12. The said lever 37 is, as there shown, provided with a hole 56 and an upturned end 57. The said mirror-release or operating lever 37 is attached to the plate 35 by means of a shoulder rivet 58, shown in Figs. 9 and 10. The said mirror latch 48 is provided with a cam shaped arm 59 which is parallel with the other arm of the said U-shaped structure. The said arm 59 is engaged by the upturned end 57 of the lever 37 when said lever 37 is depressed for making an exposure. This structure is most clearly shown in Fig. 9.

The mirror-release plate 35 is provided with upturned lugs or bosses 60, 60, which limit the movement of the said lever 37. The said coiled spring 53 is provided with a hooked end 61, best shown in Figs. 6 and 8, and which overlies the arms-connecting portion of the said U-shaped latch 48, and is also provided on the opposite end with a circular loop 62, shown in Fig. 8 as having a bent-over end which overlies the bent-up portion 57 of said mirror-release or operating lever 37.

The action of the spring 53 is such that the mirror-release or operating lever 37 will be caused to be thrust against the upper lug or boss 60, and the mirror-release latch 48 is caused to turn in a clockwise direction until its motion is arrested by the cam arm 59 of the mirror latch 48 engaging the said upturned end 57. The said cam arm 59 of the latch 48 is so shaped, as shown in Figs. 9 and 10, that when the mirror-release or operating lever 37 is pressed downward against the lug 60, the upturned end 57 of said lever will cause said arm 59 of the mirror latch 48 to be turned in a contraclockwise direction against the tension of the coiled spring 53, thus releasing said mirror frame 46, which thereupon is caused to swing upward as previously described. The swinging up of the mirror frame 46 operates the shutter in a manner well known in the art, and such shutter operation need not be further described herein.

In order to restore the mirror 45 to the position shown in Fig. 4, I have, as shown in Fig. 1, provided a mirror-set lever 63 attached to the mirror pivot shaft 47. The position of the said mirror-set lever 63, shown in Fig. 1, corresponds to the position of the mirror frame 46 in Fig. 4. The mirror-set structure just described constitutes no part of the present invention other than that the motion of the various parts of the mechanism are utilized to carry out the functions of the present invention, and they may be varied as desired in different applications or embodiments of my invention.

I will next describe the selected embodiment of means for coupling the motion of the mirror-release or operating lever and the diaphragm release mechanism, and for that purpose, I will refer mainly to Figs. 4, 5, 6, 8, 10 and 13.

In Figs. 5 and 6 is shown the mechanism for coupling the motion of the mirror-release or operating lever 37 and the diaphragm-release mechanism. At the inner face of the base of the camera box or casing 20, there is suitably mounted a transversely extending plate-like rocker-member 64 which is here shown as held to the base of the camera casing 20 by screws 65, 65, passing through holes in the said rocker-member 64, the said holes being sufficiently large to allow a slight rocking movement of the said rocker-member 64, which is also provided with a curved channel 66 to act as a pivot for its movement, as most clearly shown in Figs. 5, 6 and 10.

Attached to the said rocker-member 64 by means of a shoulder rivet 67, shown in Fig. 6, is an arm 68 attached to a second arm 69 by means of a shoulder rivet 70. As most clearly shown in Fig. 10, there are provided posts 71, 72 respectively attached to the said rocker-member 64. Attached to the post 72 is a flat spring member 73 (Fig. 6) by means of a screw 74. The spring member 73 is provided with a hole through which an adjusting screw 75 passes, as best shown in Fig. 10a. The said post 71 is provided with a tapped hole into which is threaded the adjusting screw 75. The purpose of this structure just described is to permit the spring plate 73 to be adjusted with respect to the end of the mirror latch 48.

As the mirror-release or operating lever 37 is depressed, the mirror latch 48 is caused to travel in a contraclockwise direction, thereby releasing the mirror frame 46 and at the same time or very shortly thereafter (depending on the adjustment of the screw 75) the rocker-member 64 will be caused to rock on said rounded channel 66, carrying with it arm 68 and arm 69 (best shown in Figs. 6 and 10). The arm 69 is provided with an enlarged end 76 having a hole 77, best shown in Fig. 7.

Attached to the camera front 31 is a guide-member 78, shown in detail in Fig. 7 and also in Fig. 10. The portion of said guide-member that is attached to the camera front 31 is of a right angle shape. Extending from the angularly shaped portion of the guide member 78 is a horizontal extension 79, best shown in Fig. 7, a vertical extension 80 passing through the hole 77 of the arm 69, and also an upper horizontal extension 81. The presence of the said two horizontal extensions 79 and 81 is to limit the motion of the arm 69. Since the guide member 78 is attached to the camera front 31, the arms 68 and 69 are caused to be extended when the camera front 31 is moved outward and to be folded together when the said camera front is retracted. Fig. 5 shows the said arms 68, 69 when in an extended position, and Fig. 13 shows them in their collapsed or retracted condition. However, the arm 69 is free to move in a vertical direction within the limits just disclosed, regardless of the position of the camera front 31. This is necessary inasmuch as it is highly desirable to be able to operate the automatic diaphragm regardless of the position of the camera front 31.

Again referring to Fig. 6, there is attached to the lens-board 32 of the camera front 31 a bearing 82 through which passes a shaft 83 having attached to one end a diaphragm-release catch 84. On the opposite end of said shaft 83 is a hub 85 clamped to said shaft 83 by means of a clamping screw 86. Staked or otherwise secured to the hub 85 is a second lever 87, shown in Figs. 6 and 15. The said lever 87 is caused to turn in a direction so as to contact with the large end 76 of the arm 69 by means of a spring 88, shown in Fig. 11. One end of the said spring 88 is hooked over the lever 87 and the opposite end of said spring is hooked over a pin 89 attached to the lens-board 32. The said spring 88 serves two purposes, the first being to move the diaphragm release catch 84 into position to hold the automatic diaphragm dog yet to be referred to in a wide-open position, and the second being to return the operating mechanism after exposure has been made.

Referring to Fig. 5, wherein the bellows 24 is represented as extended, it is to be observed that the arms 68 and 69 have been extended or unfolded to a very considerable extent so that the distance has been increased between the shoulder rivet 67 and the enlarged end 76 of the lever 69. The mechanism has sufficient travel when in this position to operate or move the catch 84 to a considerably greater extent or by a considerably greater degree of movement than is necessary to effect the release of the automatic diaphragm dog when the operating parts are in such condition.

When the camera front 31 has been retracted or withdrawn into the camera as shown in Fig. 13, the distance between the shoulder rivet 67 and the enlarged end 76 of the arm 69 has been shortened considerably. Therefore, the travel of the automatic diaphragm catch 84 will be less than when the parts are in the position shown in Fig. 5. However, the mechanism is so adjusted by means of the adjusting screw 75 that the automatic diaphragm will be released when in this position, and of course the automatic diaphragm will be released when in the condition or position shown in Fig. 5.

Thus far, I have described the preferred mechanism for operating an automatic diaphragm, but without describing the structure of the automatic diaphragm itself.

The operating mechanism hereinbefore described is not permanently connected to the lens mount, and it is to be understood that such mechanism can be used for the operation of other devices or parts of the camera than an automatic diaphragm, as, for example, for the operation of a filter to swing or move in front of the lens after focusing has been done but before the exposure is made, or other auxiliary apparatus of a photographic camera may be connected to and operated by the said operating mechanism.

The particular mirror and diaphragm release means which I have above described, are claimed in my divisional application Ser. No. 377,035, filed February 1, 1941.

I will next described the lens barrel with the automatic diaphragm built thereinto and for that purpose I will refer first and more particularly to Figs. 14 to 19 inclusive.

Figure 14:
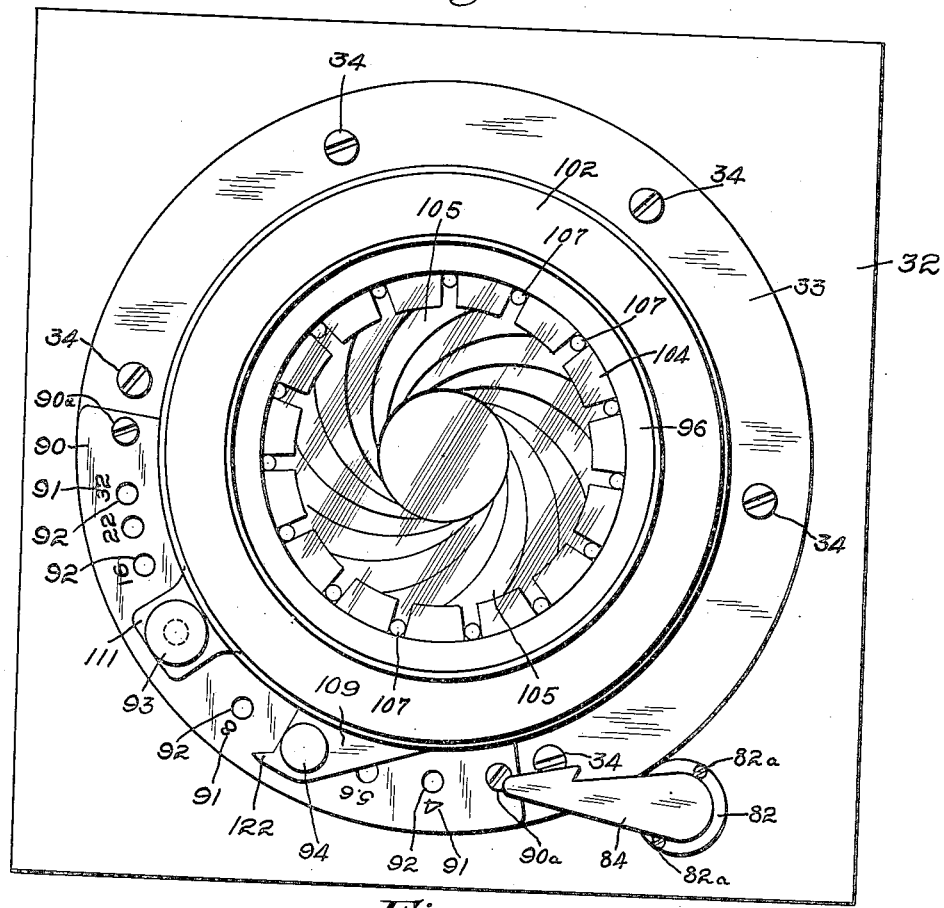
Fig. 14 is a front elevation of the lens board, on which is mounted a lens having the automatic diaphragm mechanism.
Figure 15:
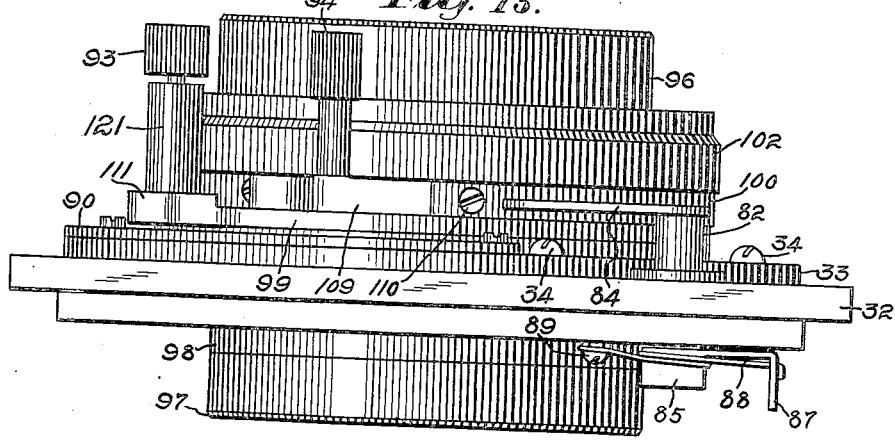
Fig. 15 is a side elevation of Fig. 14.

In Fig. 14, there is shown a diaphragm scale 90 which is held to the flange 33 of the lens board 32 by screws 90a, 90a. The said scale is provided with markings indicated generally at 91 and with index holes indicated generally at 92 as placed in alignment with the markings 91. A diaphragm-adjusting handle is represented at 93, a diaphragm ring-setting knob at 94 and a diaphragm-retaining dog at 122. The mounting of the lens cells 96 and 97 upon the lens barrel 98 is shown in Fig. 15.

In Fig. 16, wherein the lens barrel structure, indicated generally at 98, is shown in transverse section and in Fig. 17, the diaphragm stop-setting or adjusting ring is indicated at 99, the diaphragm ring at 100, the diaphragm return-spring at 101, and the diaphragm return-spring cover at 102. The lens barrel 98 is provided with a stationary diaphragm ring 103, a diaphragm actuating ring 104, and diaphragm leaves 105, each of which is provided with a pin 106 and a pin 107, best shown in Figs. 22 and 23.

The stationary diaphragm ring 103 is fastened to the lens barrel 98 in any suitable or usual manner, as by means of pins. The diaphragm actuating ring 104 is free to turn sufficiently far to cause the diaphragm aperture to be closed or stopped down to the smallest aperture. As shown in Fig. 17, the lens barrel 98 is provided with a slot 108, and riding in the said slot 108 is a diaphragm dog-plate or member 109 attached to the diaphragm actuating ring 104 and the diaphragm ring 100 by means of screws 110, 110. The diaphragm stop-setting or adjusting ring 99 has a radially extending member 111 to which the adjusting handle or knob 93 is attached. The diaphragm stop-setting or adjusting ring 99 is provided with a notched-out portion or slot 112 to afford clearance for the diaphragm dog-plate 109. One end of the diaphragm stop-setting or adjusting ring 99 is provided with a coiled spring 113 engaging a pin 114 of the diaphragm dog-plate 109. The purpose thereof is to absorb the jar when the diaphragm-actuating ring 104 and the diaphragm ring 100 are stopped against the end of the notched-out portion or slot 112 of the diaphragm stop-setting or adjusting ring 99.

The diaphragm return-spring cover 102 is provided with an opening in which the spring 101 is positioned as shown in Figs. 16, 18 and 19. One end of the said spring 101 is attached to the lens barrel 98 by means of a screw 115, shown in Fig. 20, and the opposite end of said spring 101 is attached to the diaphragm dog-plate or member 109 by means of a pin 116, also shown in Fig. 20. The said spring 101 has sufficient tension to return the diaphragm dog-plate or member 109 to a position wherein one edge of said plate or member 109 will contact with the end of the notch or slot 112 of the diaphragm stop-setting or adjusting ring 99. Said diaphragm stop setting or adjusting ring 99 is adjustable between the hole 92 opposite the diaphragm number f32, and the hole 92 opposite the diaphragm number f4 as limits. It will therefore be seen that the position of the end of the notch or slot 112 will be varied between these two extremes.

The structure of parts just set forth which is claimed in my divisional application Ser. No. 377,317, filed February 4, 1941, makes possible the use of a flat type coiled spring, such as 101, which is of the type known as a "clock spring," being rectangular in cross section and of substantial width. Such spring has a nearly uniform tension within the operating limits, as is highly desirable in this invention. The said type of spring, because of its uniform torque or tension, provides a smoother operating diaphragm, operating under very much lower spring tension, thus preventing the usual jar that would occur if the regular type of helical spring were used. When such usual helical spring is employed to operate the diaphragm, the initial tension required is so great that the inertia set up in the moving parts is sufficient to cause rapid destruction of the operating parts of the diaphragm, particularly the diaphragm pins 107. The particular advantages of such structure will be apparent when examining or considering a diaphragm leaf of a conventional lens mount. These leaves are usually made up of very thin steel, never over .003. On either end of each of these leaves is provided a pin 107 (Figs. 22 and 23), which pins necessarily have to be riveted to such leaves. Since these leaves are of such thin material, it is impossible to get a satisfactory structure as far as strength is concerned. For a helical type of spring, such as heretofore used in diaphragm operating mechanism, to have sufficient power over the full range of movement, it had to be tensioned or stretched to a point where its tension was very high at the moment of releasing the diaphragm. This set the diaphragm ring into very rapid motion, which motion had, of course, to be arrested quickly, and the inertia set up by the movement of these parts had to be absorbed somehow. The result was that in such usual constructions the rapid stopping and starting of the diaphragm leaves quickly loosened up the pins, such as 107, from the diaphragm leaves, thus making the diaphragm inoperative and useless. In addition to the advantages secured by the use of the spring 101, the coiled spring 113 and the pin 114 provide means for absorbing part of the inertia set up in the movement of the diaphragm ring, said coiled spring 113 being caused to be compressed by pin 114 at the end of the travel of the diaphragm ring clockwise, viewing Fig. 17. Such inertia-absorbing means, if the usual helical spring were used, would not be sufficient to prevent the rapid destruction of the diaphragm leaves, but when used in cooperation with the flat spring 101 they are entirely sufficient for the purpose.

As shown in Fig. 18, the diaphragm stop-adjusting knob or handle 93 is provided with a pin 117 having a shoulder 118 and a dowell end 119 for engaging any of the holes 92 in the plate 90. The pin 117 is caused to be thrust downward under the influence of a spring 120 in the barrel 121, as shown in Fig. 18. The said barrel 121 is threaded into the radially extending member 111 of the diaphragm stop-setting or adjusting ring 99. In Fig. 17, the diaphragm actuating ring 104 is represented as having been moved in a contraclockwise direction until a dog 122 of the dog-plate or member 109 is engaged by the catch 84. Inasmuch as said dog-plate or member 109 is attached to the diaphragm actuating ring 104, the said ring will also be turned in a contraclockwise direction sufficiently far to open completely the diaphragm, and the said ring 104 will be held in this position until released in a manner already described. This operation puts tension upon the spring 101. Inasmuch as the diaphragm stop-setting or adjusting ring 99 can be adjusted to any position within the limits of f32 or f4, or any other diaphragm setting that is or may be provided, the said diaphragm dog-plate or member 109 will be stopped against the end of the notch or slot 112 when the dog 122 is released from the latch 84.

It will be understood from the just preceding description of parts that I have provided means for sufficiently opening the diaphragm and holding it in open position and then allowing it to be stopped down to any pre-selected condition upon the release of the latch 84.

The action of the diaphragm leaves 105 is accomplished in a manner already referred to and well known in the art; that is to say, as best shown in Figs. 22 and 23, each leaf 105 is provided with the two pins 106, 107 at opposite ends and faces thereof. The pins 106 engage holes in the stationary diaphragm ring 103 and the pins 107 engage slots 123 in the diaphragm actuating ring 104, as shown in Figs. 14, 16, 17, 20 and 21. As the diaphragm actuating ring 104 is turned either in a clockwise or contraclockwise direction, the diaphragm leaves 105 will be moved. If said diaphragm actuating ring 104 is moved in a contraclockwise direction, the diaphragm leaves 105 will be caused to open up, thus providing a full aperture, and when said diaphragm actuating ring 104 is turned in a clockwise direction, the said diaphragm leaves 105 will be caused to close up more or less, as shown, for example, in Figs. 14, 20 and 21, thus providing any aperture previously selected.

A very important feature of the present invention is that all the mechanism directly connected or related to the automatic diaphragm control mechanism is mounted on the lens board 32, which can be removed from the camera very quickly and in the ordinary manner and without in any way disarranging or misadjusting any of the mechanism for operating the diaphragm-release. When the lens board 32 is removed for the substitution of another lens board with a lens of different focal length, all the parts that are mounted on said lens board are removed therewith. These parts, as will be evident from the foregoing description and as best shown in Figs. 6 and 11, are the bearing 82, the shaft 83 therein, the diaphragm-release catch 84 and the hub 85 on said shaft 83, the lever 87 on the hub 85 (best shown in Fig. 6), the spring 88 engaging the said lever 87 and the pin 89 holding one end of the spring 88.

When the lens board 32 with said parts is removed, the lever 87 that bears upon the enlarged end 76 of the arm 69 is readily withdrawn therefrom, and when a substitute lens board 32 with corresponding parts, but with a lens of different focal length, is put in position, the lever 87 of the substituted lens board will assume a proper position with respect to the enlarged end 76 of the arm 69. It will be observed that with each lens board the automatic features are controlled from the mirror release.

Therefore any number of lenses of different focal length may be respectively arranged on separate lens boards 32 and readily interchanged in the camera without requiring any adjustment of any parts of the operating mechanism. This is very important because when a operator wishes to change from a lens of one focal length to a lens of a different focal length, time is usually at a premium, and if it were necessary first to try out the mechanism to ascertain whether it is in correct alignment and functioning properly, it might be too late to make the exposure,—that is, the opportunity for taking the picture might be lost.

In the said Korling Patent No. 2,029,238, the lens barrel and its automatic diaphragm control means are mounted on a lens board which has a guide for guiding an operating dog, but the operating lever cannot be rotated sufficiently to release the dog from the guide, and it would therefore be necessary to make changes in adjustments in attempting to substitute a different lens board.

In the mechanism herein disclosed the diaphragm-release catch 84, being permanently attached to the lens board 32, remains in the correct adjustment at all times, so that any lens board 32 can be removed from the camera and then replaced, or another lens board 32 having its own diaphragm-release catch 84 and other parts could be substituted. Even though the substituted lens board 32 did not have an automatic diaphragm control, such as herein disclosed, the camera could still be operated in the usual manner without any interference whatsoever from the diaphragm control mechanism.

It is important to note that even with the automatic diaphragm control mechanism herein provided, the operation of the camera is not otherwise changed; that is to say, in order to make an exposure, the mirror-release lever 37 is depressed in the usual manner, this operation releasing the diaphragm as well as the mirror and requiring no thought on the part of the operator. It is further pointed out that in the disclosed construction the connecting means between the mirror-release lever and the diaphragm operating means are operable both when the camera front is in the infinity position and in the extended position.

When the mechanism is properly adjusted, the diaphragm-release takes place just prior to the release of the mirror. However, this action can be adjusted over a quite wide range, and the present invention is not limited to any particular time of release of the diaphragm with regard to the release of the mirror. The operator can release the diaphragm without releasing the mirror, by depressing the mirror-release lever. He can also release the diaphragm by depressing the diaphragm-release catch 84. In the event of releasing the diaphragm only, by means of the mirror-release lever, the operator should guard against over-travel which would release both mirror and shutter, thus inadvertently making an exposure.

With respect to the U shaped latch 48, it is pointed out that heretofore such a latch has been used only for the release of the mirror of reflex cameras. In the present disclosure the said latch 48 is used to release both the automatic diaphragm and the mirror, and means for adjusting the time of the release of the diaphragm with respect to the release of the mirror has been provided.

The provision of the rocker-member 64 is important. The space in which the entire mechanism may be placed is necessarily very limited and the rocker-member 64 must be made rigid and yet it must be capable of moving very easily. Moreover, it must be exceedingly strong to carry the arm 68 pivoted thereto.

The spring plate 73 presents a novel and important structure in so far as its application to diaphragm-release or mirror-release mechanism is concerned, and the adjustment of said spring plate is important. The adjusting means provided therefor is accurate and sensitive, the screw 75 having a fine thread, making very accurate adjustment possible.

In the present disclosure, all the mechanism is contained within the camera, and no part has been added to the outside of the camera excepting the mirror-release catch 84. This is important because the camera design requirements now exclude all mechanism from the outside of the camera. Moreover, since all the mechanism is inside the camera, it is thereby protected from injury or misadjustments.

The entire structure or train of operating mechanism beginning with the point of pivotal connection of the arm 68 to the rocker-member 64, through to and including the lever 87, allows the camera to be operated regardless of the position of the lens with respect to the focal plane. The pivotal points provided at 67 and 70 for the arms 68, 69 permit the camera front 31 to be moved forward and back, but with the parts connected up; in other words, the rocker-member 64 remains connected to the diaphragm operating mechanism at all times.

Briefly set forth, the operation of my invention is as follows:

The mirror reset lever 63, shown in Fig. 1, is pulled all the way back, thus setting the mirror frame 46 to the position shown in Fig. 4. The diaphragm-setting knob or handle 93 is set in any one of the diaphragm stop holes 92 opposite the diaphragm opening that is desired. The diaphragm ring-setting or opening-knob 94 is turned all the way in a contraclockwise direction until the dog 122 is engaged by the latch 84. The diaphragm will now be in the "full opening" position. The camera is then focused in the usual manner by means of the focusing knob 23, and the exposure is made by applying pressure against the mirror-release or operating lever 37, which, just before the mirror 45 is released, releases the catch 84 from the dog 122, as previously described, thus allowing the diaphragm to be closed to the position previously selected.

If the operator desires to use the camera without employing the automatic diaphragm feature, the diaphragm dog 122 is not engaged by the catch 84, but is left in position against the end of the notch or slot 112 and the diaphragm stop adjusting or setting knob or handle 93 is then moved to any position on the diaphragm index plate 90 at which the operator desires to set the diaphragm. The diaphragm opening will then correspond to the marking on the diaphragm plate 90.

It will be understood from the foregoing description that I have provided means for focusing wide-open, using the greatest amount of light the lens will pass, and at the same time the operator is enabled to make the exposure at a preselected diaphragm opening without further thought on his part concerning the matter.

Having thus described one illustrative embodiment of the invention, it is to be understood that although specific terms are employed, they are used in a generic and descriptive sense and not for purposes of limitation, the scope of the invention being set forth in the following claims.

I claim:

1. A reflex camera having a movable mirror and a movable front, a lens board carried by said movable front and readily removable therefrom, said board having a lens barrel and its lens carried thereby, so that the lens board with its lens barrel and lens may be removed as a unit from said movable front, said lens barrel having a diaphragm provided with means whereby it may be widely opened for focusing and be automatically stopped down to any predetermined smaller opening just prior to exposure, and a train of diaphragm-release mechanism partly mounted in the camera casing structure and partly mounted directly on the lens board itself, so as to be distinct from the lens barrel mounting, such train-parts being readily separable from each other in the act of removing the said lens board, without change of adjustment, thereby permitting quick removal of the lens board with all the parts of the said diaphragm-release mechanism train that are mounted on said removable lens-board, said train comprising a mirror release means on the camera structure casing, a collapsible lever pivotally mounted on the camera structure casing having one arm engaging the mirror release means and the other arm engaging the diaphragm release means which are mounted on the lens board, the diaphragm release means having means for urging it into engagement with the lever, said lever having guiding means mounted on the movable front of the camera structure for holding the lever in a position to be engaged.

2. A reflex camera having a movable mirror and a movable front, a lens board carried by said movable front and readily removable therefrom, said board having a lens barrel and its lens carried thereby, so that the lens board with its lens barrel and lens may be removed as a unit from said movable front, said lens barrel having a diaphragm provided with means whereby it may be widely opened for focusing and be automatically stopped down to any predetermined smaller opening just prior to exposure, and a train of diaphragm-release mechanism partly mounted directly in the camera casing structure and partly directly on the lens board, such train-parts being readily separable from each other without change of adjustment, thereby permitting quick removal of the lens-board with all the parts of the said diaphragm release mechanism train that are mounted on said removable lens-board, said train comprising a mirror release means on the camera structure casing, a collapsible lever pivotally mounted on the camera structure casing having one arm engaging the mirror release means and the other arm engaging the diaphragm release means which are mounted on the lens board, the diaphragm release means having means for urging it into engagement with the lever, said lever having guiding means mounted on the movable front of the camera structure for holding the lever in a position to be engaged, said diaphragm release means including a shaft and a diaphragm release catch.

3. A reflex camera having a movable mirror and a movable front, a lens board carried by said movable front and readily removable therefrom, said board having a lens barrel and its lens carried thereby, so that the lens board with its lens barrel and lens may be removed as a unit from said movable front, said lens barrel having a diaphragm provided with means whereby it may be widely opened for focusing and be automatically stopped down to any predetermined smaller opening just prior to exposure, and a train of diaphragm-release mechanism partly directly in the camera casing structure and partly directly on the lens board, said train-parts being readily separable from each other without change of adjustment, thereby permitting quick removal of the lens-board with all the parts of the said diaphragm release mechanism train that are mounted on said removable lens-board, said train comprising a mirror release means on the camera structure casing, a collapsible lever pivotally mounted on the camera structure casing having one arm engaging the mirror release means and the other arm engaging the diaphragm release means which are mounted on the lens board, the diaphragm release means having means for urging it into engagement with the lever, said lever having guiding means mounted on the movable front of the camera structure for holding the lever in a position to be engaged, said diaphragm release means including a shaft having a diaphragm-release catch and a lever having a spring engaging the same to move said catch into position to hold the diaphragm in wide open position and to return the operating mechanism after exposure.

4. A reflex camera having a movable mirror and a movable front, a lens board carried by said movable front and readily removable therefrom, said board having a lens barrel and its lens carried thereby, so that the lens board with its lens barrel and lens may be removed as a unit from said movable front, said lens barrel having a diaphragm provided with means whereby it may be widely opened for focusing and be automatically stopped down to any predetermined smaller opening just prior to exposure, and a train of diaphragm-release mechanism partly directly in the camera casing structure and partly directly on the lens board, such train-parts being readily separable from each other without change of adjustment, thereby permitting quick removal of the lens-board with all the parts of the said diaphragm release mechanism train that are mounted on said removable lens-board, said train comprising a mirror release means on the camera structure casing, a collapsible lever pivotally mounted on the camera structure casing having one arm engaging the mirror release means and the other arm engaging the diaphragm release means which are mounted on the lens board, the diaphragm release means having means for urging it into engagement with the lever, said lever having guiding means mounted on the movable front of the camera structure for holding the lever in a position to be engaged, said diaphragm release means including a shaft 83, a diaphragm release catch on said shaft 83 and a spring pressed lever 87 also on said shaft.

5. A reflex camera having a movable mirror and a movable front, a lens board carried by said movable front and readily removable therefrom, said board having a lens barrel and its lens carried thereby, so that the lens board with its lens barrel and lens may be removed as a unit from said movable front, said lens barrel having a diaphragm provided with means whereby it may be widely opened for focusing and be automatically stopped down to any predetermined smaller opening just prior to exposure, and a train of diaphragm-release mechanism partly directly in the camera casing structure and partly directly on the lens board, such train-parts being readily separable from each other without change of adjustment, thereby permitting quick removal of the lens-board with all the parts of the said diaphragm release mechanism train that are mounted on said removable lens-board, said train comprising a mirror release means on the camera structure casing, a collapsible lever pivotally mounted on the camera structure casing having one arm engaging the mirror release means and the other arm engaging the diaphragm release means which are mounted on the lens-board, the diaphragm release means having means for urging it into engagement with the lever, said lever having guiding means mounted on the movable front of the camera structure for holding the lever in a position to be engaged, said train also including a rocker-member mounted on the camera structure and to which one of said arms of the said collapsible lever is pivoted.

6. A reflex camera having a movable mirror and a movable front, a lens board carried by said movable front and readily removable therefrom, said board having a lens barrel and its lens carried thereby, so that the lens board with its lens barrel and lens may be removed as a unit from said movable front, said lens barrel having a diaphragm provided with means whereby it may be widely opened for focusing and be automatically stopped down to any predetermined smaller opening just prior to exposure, and a train of diaphragm-release mechanism partly directly in the camera casing structure and partly directly on the lens board, such train-parts being readily separable from each other without change of adjustment, thereby permitting quick removal of the lens-board with all the parts of the said diaphragm release mechanism train that are mounted on said removable lens-board, said train comprising a mirror release means on the camera structure casing, a collapsible lever pivotally mounted on the camera structure casing having one arm engaging the mirror release means and the other arm engaging the diaphragm release means which are mounted on the lens-board, the diaphragm release means having means for urging it into engagement with the lever, said lever having guiding means mounted on the movable front of the camera structure for holding the lever in a position to be engaged, said train also including a rocker member 64 mounted on the camera structure and having a spring plate 73 to be engaged by the mirror-release means.

7. A combination according to claim 6, but in which means is provided for accurately adjusting the portion of the said spring plate.

8. A reflex camera having a movable mirror and a movable front, a lens board carried by said movable front and readily removable therefrom, said board having a lens barrel and its lens carried thereby, so that the lens board with its lens barrel and lens may be removed as a unit from said movable front, said lens barrel having a diaphragm provided with means whereby it may be widely opened for focusing and be automatically stopped down to any predetermined smaller opening just prior to exposure, and a train of diaphragm-release mechanism entirely within the camera being partly mounted directly on the lens-board and partly mounted in the camera casing and readily separable to permit quick removal of the lens board without misadjusting the parts of said train when so separated, said train comprising a mirror release means on the camera structure casing, a collapsible lever pivotally mounted on the camera structure casing having one arm engaging the mirror release means and the other arm engaging the diaphragm release means which are mounted on the lens board, the diaphragm release means having means for urging it into engagement with the lever, said lever having guiding means mounted on the movable front of the camera structure for holding the lever in a position to be engaged.

9. A reflex camera having a movable mirror and a movable front, a lens board carried by said movable front and readily removable therefrom, said board having a lens barrel and its lens carried thereby, so that the lens board with its lens barrel and lens may be removed as a unit from said movable front, said lens barrel having a diaphragm provided with means whereby it may be widely opened for focusing and be automatically stopped down to any predetermined smaller opening just prior to exposure, and a train of diaphragm-release mechanism wholly within the camera, such train-parts being readily separable from each other without change of adjustment, thereby permitting quick removal of the lens-board with all the parts of the said diaphragm release mechanism train that are mounted on said removable lens-board, said train comprising a mirror release means on the camera structure casing, a collapsible lever pivotally mounted on the camera structure casing having one arm engaging the mirror release means and the other arm engaging the diaphragm release means which are mounted on the lens board, the diaphragm release means having means for urging it into engagement with the lever, said lever having guiding means mounted on the movable front of the camera structure for holding the lever in a position to be engaged, there being operating connections directly carried by the lens board, and there being a rocker member 64 mounted in the camera casing to which an arm of said collapsible lever is pivotally connected, said operating connections being operable from said rocker member and being connected to the automatic diaphragm mechanism.

10. A removable lens board for a camera, said lens board having a lens and having a diaphragm provided with means whereby it may be widely opened for focusing, and be automatically stopped down to a predetermined smaller opening just prior to exposure, and also having parts of a train of diaphragm release members directly mounted on such lens board, which parts are readily removable from the other operating means of said train within the camera casing, thereby permitting quick removal of the lens board from the camera front, such train-parts being readily separable from each other without change of adjustment, thereby permitting quick removal of the lens-board with all the parts of the said diaphragm release mechanism train that are mounted on said removable lens-board, said train comprising a mirror release means on the camera structure casing, a collapsible lever pivotally mounted on the camera structure casing having one arm engaging the mirror release means and the other arm engaging the diaphragm release means which are mounted on the lens board, the diaphragm release means having means for urging it into engagement with the lever, said lever having guiding means mounted on the movable front of the camera structure for holding the lever in a position to be engaged.

11. A removable lens board for a camera that is provided with a movable front, said lens board having a lens and having a diaphragm provided with means whereby it may be widely opened for focusing and be automatically stopped down to a smaller opening just prior to exposure, said lens board having directly mounted thereon parts of a train of diaphragm-release members, said parts being readily disengageable from other parts of the said train of diaphragm-release members which are mounted in the camera casing, thereby permitting quick removal of the lens board from the camera front, such train-parts being readily separable from each other without change of adjustment, thereby permitting quick removal of the lens-board with all the parts of the said diaphragm release mechanism train that are mounted on said removable lens-board, said train comprising a mirror release means on the camera structure casing, a collapsible lever pivotally mounted on the camera structure casing having one arm engaging the mirror release means and the other arm engaging the diaphragm release means which are mounted on the lens board, the diaphragm release means having means for urging it into engagement with the lever, said lever having guiding means mounted on the movable front of the camera structure for holding the lever in a position to be engaged.

OSCAR STEINER.